United States Patent [19]

Hongo et al.

[11] Patent Number: 4,918,132
[45] Date of Patent: Apr. 17, 1990

[54] THERMOPLASTIC POLYESTER RESIN COMPOSITION

[75] Inventors: Masafumi Hongo, Hatsukaichi; Hideyuki Shigemitsu, Otake; Naoki Yamamoto, Hiroshima; Akira Yanagase, Otake, all of Japan

[73] Assignee: Mitsubishi Rayon Company Limited, Tokyo, Japan

[21] Appl. No.: 246,752

[22] Filed: Sep. 20, 1988

[30] Foreign Application Priority Data

Sep. 21, 1987 [JP] Japan .................................. 62-236830

[51] Int. Cl.$^4$ ..................... C08L 83/04; C08L 67/02
[52] U.S. Cl. ..................... 524/504; 525/445; 525/446; 525/479; 525/903; 524/513
[58] Field of Search ............... 525/100, 101, 445, 446, 525/479, 903; 524/504, 517

[56] References Cited

U.S. PATENT DOCUMENTS

| | | | |
|---|---|---|---|
| 4,294,938 | 10/1981 | Berr et al. | 525/101 |
| 4,302,553 | 11/1981 | Frisch | 525/28 |
| 4,687,811 | 8/1987 | Sasaki et al. | 525/100 |
| 4,690,986 | 9/1987 | Sasaki et al. | 525/479 |
| 4,775,712 | 10/1988 | Sasaki et al. | 524/504 |

FOREIGN PATENT DOCUMENTS

| | | | |
|---|---|---|---|
| 0029948 | 6/1981 | European Pat. Off. | 525/446 |
| 0231776 | 8/1987 | European Pat. Off. | 525/63 |

Primary Examiner—John C. Bleutge
Assistant Examiner—R. Dean, Jr.
Attorney, Agent, or Firm—Cushman, Darby & Cushman

[57] ABSTRACT

A thermoplastic polyester resin composition comprising from 10 to 80% by weight of a thermoplastic polyester (A); from 5 to 55% by weight of a compound rubber type graft copolymer (B) having at least one vinyl monomer graft-polymerized onto a compound rubber composed of from 10 to 90% by weight of a polyorganosiloxane rubber and from 10 to 90% by weight of a polyalkyl (meth)acrylate rubber in a total amount of 100% by weight in an inseparably interlocking fashion and having an average particle size of from 0.08 to 0.6 μm; from 5 to 70% by weight of a thermoplastic polyester elastomer (C); and from 0 to 60% by weight of a filler (D), with the total amount of components (A) to (D) being 100% by weight.

5 Claims, No Drawings

THERMOPLASTIC POLYESTER RESIN COMPOSITION

The present invention relates to a thermoplastic polyester resin composition having excellent cold resistance, weather resistance, heat resistance and impact resistance.

A thermoplastic polyester such as a polyalkylene terephthalate is used in a wide range of fields such as electrical and electronic parts and automobile parts, since it has excellent mechanical properties, heat stability, weather resistance and electrical insulating properties. However, its use has been restricted because it is inferior in impact resistance, particularly in the notched impact strength Further, application of such a thermoplastic polyester resin to the interior or exterior materials for automobiles and to housings for large electronic instruments has been studied in view of the excellent mechanical and thermal properties, but it is not fully useful because its impact resistance and cold resistance are inadequate. Various proposals have been made for improvements in the impact resistance of such a thermoplastic polyester. Such proposals have been successful to some extent so long as the improvement in the impact resistance is concerned, but they are not fully used because other properties tend to be sacrificed. For example, by blending a diene rubber-reinforced resin to the thermoplastic polyester, the impact resistance can be improved, but the heat stability and weather resistance deteriorate substantially. On the other hand, by blending an acrylic rubber-reinforced resin, deterioration of the weather resistance is not substantial, but no substantial improvement in the low-temperature impact resistance will be obtained. An olefin type copolymer is effective for the improvement of the impact resistance, but it has problems such that it is likely to impair other mechanical properties, and its dispersibility is poor so that laminar separation is likely to occur.

The present inventors have conducted extensive research for a method of improving the impact resistance of the thermoplastic polyester, while retaining the excellent heat stability and weather resistance inherent to the thermoplastic polyester and, as a result, have proposed to incorporate to a thermoplastic polyester a graft copolymer having a vinyl monomer graft-polymerized at a high efficiency onto a polyorganosiloxane and a thermoplastic polyester elastomer. This system was successful for the improvement of the impact resistance and weather resistance. Further research by the present inventors, has discovered surprisingly that the impact resistance and the surface appearance can further be improved substantially by using a novel compound rubber type graft copolymer based on a compound rubber composed of a polyorganosiloxane rubber and an alkyl (meth)acrylate rubber. The present invention has been accomplished based on this discovery.

The present invention provides a thermoplastic polyester resin composition comprising from 10 to 80% by weight of a thermoplastic polyester (A); from 5 to 55% by weight of a compound rubber type graft copolymer (B) having at least one vinyl monomer graft-polymerized onto a compound rubber composed of from 10 to 90% by weight of a polyorganosiloxane rubber and from 10 to 90% by weight of a polyalkyl (meth)acrylate rubber in a total amount of 100% by weight in an inseparably interlocking fashion and having an average particle size of from 0.08 to 0.6 μm; from to 70% by weight of a thermoplastic polyester elastomer (C); and from 0 to 60% by weight of a filler (D), with the total amount of components (A) to (D) being 100% by weight.

The resin composition of the present invention provides excellent heat stability, impact resistance, particularly the low-temperature impact resistance, and weather resistance, but also the colorability with a colorant is improved substantially, and it is capable of providing a molded product having excellent surface appearance and gloss.

Now, the present invention will be described in detail with reference to the preferred embodiments.

The thermoplastic polyester (A) to be used in the present invention is composed mainly of an aromatic dicarboxylic acid having from 8 to 22 carbon atoms and an alkylene glycol, cycloalkylene glycol or aralkylene glycol having from 2 to 22 carbon atoms, which may, in some cases, contain a small amount of an aliphatic dicarboxylic acid such as adipic acid or sebacic acid, or a polyalkylene glycol such as polyethylene glycol or polytetramethylene glycol. As particularly preferred polyesters, polyethylene terephthalate and polytetramethylene terephthalate may be mentioned. These thermoplastic polyesters may be used in combination as a mixture of two or more different kinds.

In the present invention, the content of the thermoplastic polyester (A) in the entire composition is from 10 to 80% by weight. If the content is outside this range, the resin composition intended by the present invention tends to be hardly obtainable, such being undesirable.

By adjusting the proportions of components (A), (B) and (C), it is possible to obtain various compositions ranging from hard to soft products, and it is possible to obtain products which are excellent particularly in the impact resistance.

The compound rubber type graft copolymer (B) to be used in the present invention is a copolymer having at least one vinyl monomer graft-polymerized onto a compound rubber composed of from 10 to 90% by weight of a polyorganosiloxane rubber and from 10 to 90% by weight of a polyalkyl (meth)acrylate rubber in a total amount of 100% by weight in an inseparably interlocking fashion and having an average particle size of from 0 08 to 0.6 μm.

It is impossible to obtain the desired properties of the resin composition of the present invention even if either the polyorganosiloxane rubber or the polyalkyl (meth)acrylate rubber, or a simple mixture of the two rubber components is used as the rubber source instead of the above-mentioned compound rubber When the polyorganosiloxane rubber and the polyalkyl (meth)acrylate rubber are interlocked to form a unitary composite, it is for the first time possible to obtain a resin composition which is capable of providing a molded product having excellent impact resistance and surface appearance.

If the polyorganosiloxane rubber constituting the compound rubber exceeds 90% by weight, the surface appearance of a molded product of the resin composition thereby obtained tends to be poor. Whereas, if the polyalkyl (meth)acrylate rubber exceeds 90% by weight, the impact resistance of a molded product of the resin composition thereby obtained tends to be poor. Therefore, each of the two rubber components constituting the compound rubber is required to be within a range of from 10 to 90% by weight (provided that the total amount of the two rubber components is 100% by weight). It is particularly preferred that each of them is within a range of from 20 to 80% by weight. The average particle size of the compound rubber is required to be within a range of from 0.08 to 0.6 μm. If the average particle size is less than 0.08 μm, the impact resistance of a molded product of the resin composition thereby obtained, tends to be poor. On the other hand, if the average particle size exceeds 0.6 μm, the surface appearance of a molded product from the resin composition thereby obtained, tends to be poor. Emulsion polymerization is most suitable to obtain the compound rubber having such an average particle size. It is preferred that firstly a latex of the polyorganosiloxane rubber is prepared, and then the rubber particles of the polyorganosiloxane rubber latex are impregnated with a monomer for the synthesis of the alkyl (meth)acrylate rubber, followed by the polymerization of the monomer.

The polyorganosiloxane rubber constituting the above compound rubber may be prepared by emulsion polymerization using an organosiloxane and a crosslinking agent (I) as described hereinafter. At that time, a grafting agent (I) may further be used.

The organosiloxane may be various types of cyclic siloxanes of at least three-membered ring, preferably from 3- to 6-membered cyclosiloxanes. For example, hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane and octaphenylcyclotetrasiloxane. These siloxanes may be used alone or in combination as a mixture of two or more different types. The organosiloxane is used in an amount of at least 50% by weight, preferably at least 70% by weight, in the polyorganosiloxane rubber.

The crosslinking agent (I) may be a trifunctional or tetrafunctional silane type crosslinking agent, such as trimethoxymethylsilane, triethoxyphenylsilane, tetramethoxysilane, tetraethoxysilane, tetra-n-propoxysilane or tetrabutoxysilane. Tetrafunctional crosslinking agents are particularly preferred, and among them, tetraethoxysilane is especially preferred. The crosslinking agent is used usually in an amount of from 0.1 to 30% by weight in the polyorganosiloxane rubber.

The grafting agent (I) may be a compound capable of forming a unit represented by the formula:

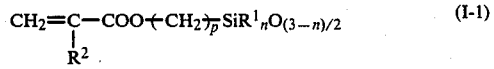 (I-1)

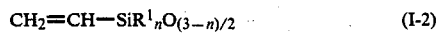 (I-2)

or

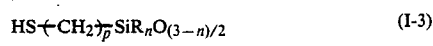 (I-3)

wherein $R^1$ is a methyl group, an ethyl group, a propyl group or a phenyl group, $R^2$ is a hydrogen atom or a methyl group, n is 0, 1 or 2, and p is a number of from 1 to 6.

A (meth)acryloyloxysiloxane capable of forming the unit of the formula (I-1) has a high graft efficiency and thus is capable of forming effective graft chains, and it is advantageous from the viewpoint of providing impact resistance. A methacryloyloxysiloxane is particularly preferred as the compound capable of forming the unit of the formula (I-1). Specific examples of the methacryloyloxysiloxane include β-methacryloyloxyethyldimethoxymethylsilane, γ-methacryloyloxypropylmethoxydimethylsilane, γ-methacryloyloxypropyldimethoxymethylsilane, γ-methacryloyloxypropyltrimethoxysilane, γ-methacryloyloxypropylethoxydiethylsilane, γ-methacryloyloxypropyldiethoxymethylsilane and δ-methacryloyloxybutyldiethoxymethylsilane.

The grafting agent is used usually in an amount of from 0 to 10% by weight in the polyorganosiloxane rubber.

The latex of this polyorganosiloxane rubber may be prepared by a process disclosed, for example, in U.S. Pat. No. 2,891,920 or U.S. Pat. No. 3,294,725. In the present invention, such a latex is preferably prepared in such a manner that a solution mixture of the organosiloxane, the crosslinking agent (I) and optionally the grafting agent (I) is subjected to shear-mixing with water by means of e.g. a homogenizer in the presence of a sulfonic acid type emulsifier such as an alkylbenzenesulfonic acid or an alkylsulfonic acid. The alkylbenzenesulfonic acid is preferred since it serves not only as an emulsifier for the organosiloxane but also as a polymerization initiator. Further, it is preferred to combine a metal salt of an alkylbenzenesulfonic acid or a metal salt of an alkylsulfonic acid, since such combined use is effective for maintaining the polymer under a stabilized condition during the graft polymerization.

Next, the polyalkyl (meth)acrylate rubber constituting the compound rubber may be prepared by using an alkyl (meth)acrylate, a crosslinking agent (II) and a grafting agent (II) as described hereinafter.

The alkyl (meth)acrylate may be an acryl acrylate such as methyl acrylate, ethyl acrylate, n-propyl acrylate, n-butyl acrylate or 2-ethylhexyl acrylate, or an alkyl methacrylate such as hexyl methacrylate, 2-ethylhexyl methacrylate or n-lauryl methacrylate. It is particularly preferred to use n-butyl acrylate.

The crosslinking agent (II) may be, for example, ethylene glycol dimethacrylate, propylene glycol dimethacrylate, 1,3-butylene glycol dimethacrylate or 1,4-butylene glycol dimethacrylate.

The grafting agent (II) may be, for example, allyl methacrylate, triallyl cyanurate or triallyl isocyanurate. Allyl methacrylate can be used also as a crosslinking agent.

These crosslinking agents and grafting agents may be used alone or in combination as a mixture of two or more different types. The total amount of such crosslinking agent and grafting agent is from 0.1 to 20% by weight in the polyalkyl (meth)acrylate rubber.

The polymerization of the polyalkyl (meth)acrylate rubber is conducted by adding the above-mentioned alkyl (meth)acrylate, the crosslinking agent and the grafting agent into the latex of the polyorganosiloxane rubber neutralized by an addition of an aqueous solution of an alkali such as sodium hydroxide, potassium hydroxide or sodium carbonate to have them impregnated into the polyorganosiloxane rubber particles, followed by an addition of a usual radical polymerization initiator. As the polymerization progresses, a cross-linked network of a polyalkyl (meth)acrylate rubber interlocked with the cross-linked network of the polyorganosiloxane rubber will be formed to obtain a latex of a compound rubber wherein the polyorganosiloxane rubber and the polyalkyl (meth)acrylate rubber are interlocked in an inseparable manner. In the present invention, as the compound rubber, it is preferred to use a compound rubber wherein the backbone of the polyorganosiloxane rubber has repeating units of dimethylsiloxane and the backbone of the polyalkyl (meth)acrylate rubber has repeating units of n-butyl acrylate.

The compound rubber thus prepared by emulsion polymerization, is graft-copolymerizable with a vinyl monomer. Further, the polyorganosiloxane rubber and the polyalkyl (meth)acrylate rubber are firmly interlocked, so that they can not be separated by extraction with a usual organic solvent such as acetone or toluene. The gel content of the compound rubber measured by extraction with toluene at 90° C. for 12 hours is at least 80% by weight.

The vinyl monomer to be graft-polymerized onto this compound rubber, may be various vinyl monomers including an alkenyl aromatic compound such as styrene, α-methylstyrene or vinyltoluene; a methacrylic acid ester such as methyl methacrylate or 2-ethylhexyl methacrylate; an acrylic acid ester such as methyl acrylate, ethyl acrylate or butyl acrylate; and a vinyl cyanide compound such as acrylonitrile or methacrylonitrile. These vinyl monomers may be used alone or in combination as a mixture of two or more different kinds.

The proportions of the compound rubber and the vinyl monomer in the compound rubber type graft copolymer (B) are preferably such that the compound rubber is from 30 to 95% by weight, preferably from 40 to 90% by weight and the vinyl monomer is from 5 to 70% by weight, preferably from 10 to 60% by weight, based on the weight of the graft copolymer (B). If the vinyl monomer is less than 5% by weight, the dispersion of the graft copolymer (B) in the resin composition tends to be inadequate. On the other hand, if it exceeds 70% by weight, the effect for the improvement of the impact strength tends to be low, such being undesirable.

The compound rubber type graft copolymer (B) can be separated and recovered in such a manner that a compound rubber type graft copolymer latex obtained by adding the above-mentioned vinyl monomer to a latex of the compound rubber, followed by polymerization in a single step or in multiple steps by a radical polymerization technique, is poured into hot water in which a metal salt such as calcium chloride or magnesium sulfate is dissolved, followed by salting out and coagulation.

In the present invention, the content of the compound rubber type graft copolymer (B) in the entire resin composition is from 5 to 55% by weight. If the content is less than 5% by weight, the extrusion stability of the resin composition will be inadequate, and the low-temperature impact resistance tends to be inadequate. On the other hand, if the copolymer (B) exceeds 55% by weight, the heat resistance of the resin composition tends to be low, such being undesirable.

The thermoplastic polyester elastomer (C) in the present invention is obtained by block copolymerization of an aromatic crystalline polyester as a hard segment component and an aliphatic polyester or polyether as a soft segment component. The aromatic crystalline polyester may be polyethylene terephthalate or polytetramethylene terephthalate. The aliphatic polyester may be polylactone or polytetramethylene sebacate. The polyether may be polytetramethylene ether. A particularly preferred thermoplastic polyester elastomer (C) is a block copolymer of polytetramethylene terephthalate with polytetramethylene ether glycol or poly-ε-caprolactone. Various ratios may be employed as the copolymerization ratios of the hard component and the soft component. The elastomer wherein the soft component is from 30 to 70% by weight is effective for the improvement of the impact resistance. The soft component in the polyester elastomer and the above-mentioned compound rubber type graft copolymer (B) are interrelated to absorb the impact, and if one of them is omitted, the ability to absorb the impact is reduced to a large extent.

Therefore, the content of the thermoplastic polyester elastomer (C) in the resin composition of the present invention is preferably from 5 to 70% by weight. If the content is less than 5% by weight, the amount of the soft component required to share the absorption of the impact with the compound rubber type graft copolymer (B), will be inadequate, whereby no adequate impact resistance will be obtained. On the other hand, if the content exceeds 70% by weight, the heat resistance of the resin composition tends to be low, such being undesirable.

The resin composition of the present invention is prepared by blending from 10 to 80% by weight of the thermoplastic polyester (A), from 5 to 55% by weight of the compound rubber type graft copolymer (B), from 5 to 70% by weight of the thermoplastic polyester elastomer (C) and from 0 to 60% by weight of the filler (D) so that the total amount of the respective components is 100% by weight. This mixture is preferably melt-mixed and pelletized.

The filler (D) may be of various types and of various shapes. For example, natural or synthetic fillers may be mentioned, including fibrous fillers such as glass fibers, carbon fibers, aramide fibers, metal fibers, asbestos or whiskers, and particles or powders of spherical, plate-like or non-specific shape, such as glass beads, glass flakes, calcium carbonate, talc, mica, aluminum oxide, magnesium hydroxide, boron nitride, beryllium oxide, calcium silicate, clay and metal powder. These fillers (D) are effective to strengthen the mechanical properties, particularly the rigidity and heat resistance, and they may be used alone or in combination. The filler (D) is incorporated usually in an amount of from 0 to 60% by weight of the entire resin composition. A polyester resin containing a reinforcing filler is well known. However, an addition of the filler frequently brings about a deterioration of the impact resistance. The reinforced resin composition of the present invention shows excellent impact resistance and heat stability, whereby the improvement in the heat resistance and rigidity by a reinforcing agent is effectively used.

The resin composition of the present invention may contain a dyestuff or pigment, a heat stabilizer, a known flame retardant such as epoxy bromide, brominated polycarbonate, decabromodiphenylether or antimony oxide, a crystal nucleating agent, various modifiers, or a releasing agent such as wax, as the case requires.

Now, the present invention will be described in further detail with reference to Examples. However, it should be understood that the present invention is by no means restricted by such specific Examples. In these Examples, "parts" means "parts by weight".

REFERENCE EXAMPLE 1

Preparation of a compound rubber type graft copolymer (S-1)

Two parts of tetraethoxysilane, 0.5 part of γ-methacryloyloxypropyldimethoxymethylsilane and 97.5 parts of octamethylcyclotetrasiloxane were mixed to obtain 00 parts of a siloxane mixture. Then, 100 parts of the siloxane mixture was added to 200 parts of distilled water having 1 part of sodium dodecylbenzene sulfonate and 1 part of dodecylbenzene sulfonic acid dissolved therein. The mixture was preliminarily stirred at 10,000 rpm by a homomixer and then emulsified and dispersed under a pressure of 300 kg/cm$^2$ by a homogenizer to obtain an organosiloxane latex. This mixture was transferred to a separable flask equipped with a condenser and a stirrer, and it was heated at 80° C. for 5 hours under stirring and mixing and then left at 20° C. for 48 hours. Then, this latex was neutralized to pH 6.9 with an aqueous sodium hydroxide solution, and the polymerization was completed to obtain a polyorganosiloxane rubber latex 1. The degree of polymerization of the polyorganosiloxane rubber thus obtained was 89.7%, and the average particle size of the polyorganosiloxane rubber was 0.16 μm.

Then, 100 parts of the polyorganosiloxane rubber latex 1 was introduced into a separable flask equipped with a stirrer, and 120 parts of distilled water was added thereto. After flushing with nitrogen, the mixture was heated to 50° C., and a mixed solution comprising 37.5 parts of n-butyl acrylate, 2.5 parts of allyl methacrylate and 0.3 part of tert-butyl hydroperoxide, was charged, and the mixture was stirred for 30 minutes to impregnate the mixed solution into the polyorganosiloxane rubber particles. Then, a mixed solution comprising 0.0003 part of ferrous sulfate, 0.001 part of disodium ethylenediamine tetraacetate, 0.17 part of Rongalite and 3 parts of distilled water, was charged thereto to initiate radical polymerization, and the internal temperature was maintained at 70° C. for 2 hours to complete the polymerization to obtain a compound rubber latex. A part of this latex was sampled, and the average particle size of the compound rubber was measured and found to be 0.19 μm. This latex was dried to obtain a solid product, which was extracted with toluene at 90° C. for 12 hours, whereby the gel content was measured and found to be 90.3% by weight. To this compound rubber latex, a mixed solution comprising 0.3 part of tert-butyl hydroperoxide, 9 parts of acrylonitrile and 21 parts of styrene, was dropwise added over a period of 45 minutes at 70° C., and the mixture was maintained at 70° C. for 4 hours to complete the graft polymerization onto the compound rubber.

The degree of polymerization of the graft copolymer thereby obtained was 98.6%. The graft copolymer latex thus obtained was dropwise added to hot water containing 5% by weight of calcium chloride and coagulated, and the coagulated product was separated, washed and dried at 75° C. for 16 hours to obtain a compound rubber type graft copolymer S-1.

COMPARATIVE REFERENCE EXAMPLE

Preparation of an organosiloxane qraft copolymer C-1 and an acrylate graft copolymer C-2

233 Parts of the above-mentioned polyorganosiloxane rubber latex 1 was charged into a separable flask equipped with a stirrer, heated to 70° C. and stirred. Then, a mixed solution comprising 0.0003 part of ferrous sulfate, 0.001 part of disodium ethylenediamine tetraacetate, 0.17 part of Rongalite and 3 parts of distilled water, was charged thereto, and a mixed solution comprising 0.3 part of tert-butyl hydroperoxide, 9 parts of acrylonitrile and 21 parts of styrene, was dropwise added thereto over a period of 45 minutes. Then, the mixture was maintained at 70° C. for 4 hours to complete the graft polymerization.

The degree of polymerization of the copolymer thereby obtained was 97.5%. This latex was dropwise added to hot water containing 5% by weight of calcium chloride and coagulated, and the coagulated product was separated, washed and dried at 75° C. for 16 hours to obtain an organosiloxane graft copolymer C-1.

For the preparation of an acrylate graft copolymer, a mixed solution comprising 67.5 parts of n-butyl acrylate, 2.5 parts of allyl methacrylate and 0.3 part of tert-butyl hydroperoxide was emulsified in 200 parts of distilled water having 2 parts of sodium dodecylbenzene sulfonate dissolved therein. After flushing with nitrogen, the mixture was heated to 50° C., and the polymerization was initiated by an addition of a redox type radical initiator. After completion of the polymerization of butyl acrylate, a mixed solution comprising 9 parts of acrylonitrile, 21 parts of styrene and 0.3 part of tert-butyl hydroperoxide, was dropwise added at 70° C. for graft copolymerization. After completion of the polymerization, coagulation, washing and drying were conducted to obtain a graft copolymer C-2.

EXAMPLE 1 and COMPARATIVE EXAMPLES 1 to 4

The graft copolymers S-1, C-1 and C-2 obtained in Reference Example 1 and Comparative Reference Example were blended with a polytetramethylene terephthalate having an intrinsic viscosity [η] of 1.10 and a thermoplastic polyester elastomer obtained by block copolymerizing 70% by weight of the polytetramethylene terephthalate and 30% by weight of a polytetramethylene ether glycol having an average molecular weight of 1,000 in the proportions as identified in Table 1.

Each blend was supplied to a 30 mmφ vent-type twin-screw extruder, melt-kneaded at a cylinder temperature of 230° C. and pelletized. The pellets thus obtained were dried and then injection-molded at a cylinder temperature of 230° C. and a mold temperature of 60° C. to obtain test pieces for various evaluations. The results obtained by the evaluation by using such test pieces are shown in Table 1.

TABLE 1

| | Composition | | | | Izod impact strength | | Heat resistance | |
| | Polytetramethylene terephthalate (parts) | Polyester elastomer (parts) | Graft copolymer | | Notched 23° C. | Notched —° C. | Heat sag | |
| | | | Type | Amount (parts) | (kg · cm/cm) | (kg · cm/cm) | 130° C. × 1 hr (mm) | Surface appearance |
| Example 1 | 70 | 10 | S-1 | 20 | 53 | 24 | 5 | Good |
| Comparative | 70 | 10 | C-1 | 20 | 52 | 18 | 7.5 | Pearl gloss |

TABLE 1-continued

| | Composition | | | | Izod impact strength | | Heat resistance | |
|---|---|---|---|---|---|---|---|---|
| | Polytetra-methylene terephthalate (parts) | Polyester elastomer (parts) | Graft copolymer | | Notched 23° C. | Notched −° C. | Heat sag | Surface appearance |
| | | | Type | Amount (parts) | (kg · cm/cm) | (kg · cm/cm) | 130° C. × 1 hr (mm) | |
| Example 1 Comparative Example 2 | 70 | 10 | C-2 | 20 | 48 | 6.0 | 5 | Good |
| Comparative Example 3 | 80 | — | S-1 | 20 | 12.0 | 8.5 | 5.5 | Pearl gloss |
| Comparative Example 4 | 90 | 10 | — | | 9.5 | 4.0 | 4 | Good |

The izod impact strength in Table 1 was measured in accordance with ASTM D256 by using a notched test piece having a thickness of ¼ inches. The heat sag was determined by maintaining a test piece having a width of 12.5 mm, a length of 127 mm and a thickness of 3.2 mm with an overhang of 100 mm in an oven of 130° C. and measuring the deflection (mm) by heat of the forward end portion.

The surface appearance was visually evaluated with respect to a flat plate of 50 mm × 80 mm with a thickness of 3 mm.

the present invention. These compositions were injection-molded, and the impact resistance and heat resistance were evaluated. The results are shown in Table 2.

Further, with respect to the molded products of the compositions of Examples 2 and 6, other physical properties were evaluated. The results are shown in Table 3. As is evident from Table 3, it is possible to obtain products having a wide range of elasticity from the resin compositions of the present invention, and they exhibit excellent impact resistance and heat resistance within the range.

TABLE 2

| | Composition | | | | | Izod impact strength (notched) | | Heat resistance Heat sag |
|---|---|---|---|---|---|---|---|---|
| | Polytetra-methylene terephthalak (parts) | Polyester elastomer | | Rubber type graft copolymer | | (kg · cm/cm) | | 130° C. × 1 hr (mm) |
| | | Type | Amount (parts) | Type | Amount (parts) | 23° C. | −30° C. | |
| Example 2 | 60 | E-1 | 20 | S-1 | 20 | 68 | 30 | 5 |
| Example 3 | 53 | E-1 | 27 | S-1 | 20 | 70 | 32 | 6 |
| Example 4 | 40 | E-2 | 40 | S-1 | 20 | 80 | 56 | 7 |
| Example 5 | 30 | E-2 | 50 | S-1 | 20 | 80 | 80 | 9 |
| Example 6 | 28 | E-2 | 57 | S-1 | 15 | 80 | 80 | 7.5 |
| Example 7 | 24 | E-2 | 48 | S-1 | 28 | 80 | 60 | 9 |

TABLE 3

| | Measuring method | Test piece | Unit | Example 2 | Example 6 |
|---|---|---|---|---|---|
| Tensile strength | ASTM D638 | ASTM No. 1 dumbbell test piece | kg/cm² | 260 | 180 |
| Elongation | ASTM D638 | ASTM No. 1 dumbbell test piece | % | 170 | 390 |
| Flexural strength | ASTM D790 | ½" W × 5" L × ¼" T test piece | kg/cm² | 390 | 170 |
| Flexural modulus | ASTM D790 | ½" W × 5" L × ¼" T test piece | kg/cm² | 11,000 | 3,200 |

It is evident from Table 1 that the product of the present invention wherein the compound rubber-based graft copolymer was used, had excellent low-temperature impact resistance which can not be expected from the respective single rubber-based graft copolymers, and the heat resistance was also excellent with a little deflection. Further, the product had a good outer appearance without pearl gloss.

EXAMPLES 2 to 7

The polytetramethylene terephthalate, the polyester elastomer E-1 and the compound rubber type graft copolymer S-1 as used in Example 1 and a polyester elastomer E-2 composed of a polytetramethylene terephthalate segment (60%) and a polytetramethylene ether glycol segment (40%) were blended in the proportions as identified in Table 2 and treated in the same manner as in Example 1 to obtain resin compositions of EXAMPLES 8 to 11

In the same manner as in Reference Example 1, compound rubber type graft copolymers S-2 and S-3 having the compositions as identified in Table 4 were prepared. These copolymers S-2 and S-3 were blended with a polyethylene terephthalate (solid phase polymerization product) having an intrinsic viscosity [η] of 1.20 and the block copolymer E-3 composed of a polytetramethylene terephthalate segment (60%) and a poly-ε-caprolactone segment (40%) or the elastomer E-2 as used in Example 2, in the proportions as identified in Table 5 and treated in the same manner as in Example 1 to obtain resin compositions of the present invention. However, in Example 11 in Table 5, 15% by weight, based on the entire composition, of commercially available 3 mm chopped strand glass fibers were added before extrusion. In each Example, the extrusion and the injection molding were conducted at a temperature of 250° C. The results are shown in Table 5.

Comparative Example 5 is a product reinforced by 15% of glass fibers and corresponds to Example 11 except that the compound rubber type graft copolymer S-2 was not incorporated.

TABLE 4

Compositions of compound rubber type graft copolymers

|  |  | S-2 | S-3 |
|---|---|---|---|
| Compound rubber | Polyorganosiloxane-1 (solid content) | 25 | 15 |
|  | n-Butyl acrylate | 32.5 | 52.5 |
|  | Allyl methacrylate | 2.5 | 2.5 |
|  | t-Butyl hydroperoxide | 0.3 | 0.3 |
| Graft | Acrylonitrile | 9 | — |
|  | Styrene | 21 | 9 |
|  | Methyl methacrylate | — | 21 |
|  | t-Butyl hydroperoxide | 0.3 | 0.3 |

TABLE 5

| | Composition | | | | | Izod impact strength (notched) (kg · cm/cm) | |
|---|---|---|---|---|---|---|---|
| | Polyethylene terephthalate (parts) | Rubber type graft copolymer | | Polyester elastomer | | | |
| | | Type | Amount (parts) | Type | Amount (parts) | 23° C. | −30° C. |
| Example 8 | 20 | S-2 | 30 | E-3 | 50 | 61 | 32 |
| Example 9 | 25 | S-3 | 20 | E-2 | 55 | 75 | 78 |
| Example 10 | 25 | S-3 | 10 | E-2 | 65 | 80 | 66 |
| Example 11 | 50 | S-2 | 30 | E-3 | 20 | 14 | 10 |
| Comparative Example 5 | 71.4 | — | | E-3 | 28.6 | 5 | 4 |

In the present invention, a thermoplastic polyester, a specific polyorganosiloxane-polyalkyl (meth)acrylate compound rubber type graft copolymer and a polyester elastomer are blended in the above-mentioned proportions. It is thereby possible to obtain a resin composition which is excellent particularly in the low temperature impact resistance and which also has excellent weather resistance and heat resistance. The resin composition is suitable for use for e.g. exterior materials for automobiles.

We claim:

1. A thermoplastic polyester resin composition comprising:
   (1) from 10 to 80% by weight of a thermoplastic polyester (A), composed mainly of an aromatic dicarboxylic acid having from 8 to 22 carbon atoms and alkylene glycol, cycloalkylene glycol or aralykylene glycol having from 2 to 22 carbon atoms;
   (2) from 5 to 55% by weight of a compound rubber graft copolymer (B) having at least one vinyl monomer graft-polymerized onto a compound rubber composed of from 10 to 90% by weight of a polyorganosiloxane rubber and from 10 to 90% by weight of a polyalkyl (meth)acrylate rubber in a total amount of 100% by weight in an inseparably interlocking fashion and having an average particle size of from 0.08 to 0.6 μm;
   (3) from 5 to 70% by weight of a thermoplastic polyester elastomer (C), obtained from block copolymerization of an aromatic crystalline polyester as a hard segment component and an aliphatic polyester or polyether as a soft segment component; and
   (4) from 0 to 60% by weight of a filler (D), with the total amount of components (A) to (D) being 100% by weight.

2. The thermoplastic polyester resin composition according to claim 1, wherein the compound rubber is composed of a polyorganosiloxane rubber prepared by the emulsion polymerization of an organosiloxane with a crosslinking agent, and a grafting agent or an organosiloxane with a crosslinking agent and a polyalkyl (meth) acrylate rubber prepared by impregnating the polyorganosiloxane rubber with an alky (meth)acrylate, a crosslinking agent and a grafting agent, followed by polymerization.

3. The thermoplastic polyester resin composition according to claim 1, wherein the polyorganosiloxane rubber has a backbone made up of repeating units of dimethylsiloxane, and the polyalkyl (meth)acrylate rubber has a backbone made up of repeating units of n-butyl acrylate.

4. The thermoplastic polyester resin composition according to claim 2, wherein the polyorganosiloxane rubber has a backbone made up of repeating units of dimethylsiloxane, and the polyalkyl (meth)acrylate rubber has a backbone made up of repeating units of n-butyl acrylate.

5. The thermoplastic polyester resin composition according to claim 1, wherein the compound rubber has a gel content measured by extraction with toluene of at least 80% by weight.

* * * * *